(12) United States Patent
Hensler et al.

(10) Patent No.: US 12,656,059 B2
(45) Date of Patent: Jun. 16, 2026

(54) PROCESS FOR REMOVING WATER FROM A PARTICULATE MATERIAL

(71) Applicant: BASF SE, Ludwigshafen (DE)

(72) Inventors: Timo Hensler, Ludwigshafen (DE); Andreas Michael Kern, Ludwigshafen (DE); Raquel Fiz Gonzalez, Ludwigshafen (DE); Thorsten Beierling, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 575 days.

(21) Appl. No.: 18/256,081

(22) PCT Filed: Dec. 10, 2021

(86) PCT No.: PCT/EP2021/085257
§ 371 (c)(1),
(2) Date: Jun. 6, 2023

(87) PCT Pub. No.: WO2022/128804
PCT Pub. Date: Jun. 23, 2022

(65) Prior Publication Data
US 2024/0110747 A1      Apr. 4, 2024

(30) Foreign Application Priority Data
Dec. 18, 2020      (EP) .................................... 20215380

(51) Int. Cl.
*F26B 3/02*          (2006.01)
*C01G 53/06*       (2006.01)
*F26B 23/06*       (2006.01)

(52) U.S. Cl.
CPC ................ *F26B 3/02* (2013.01); *C01G 53/06* (2013.01); *F26B 23/06* (2013.01)

(58) Field of Classification Search
CPC ............. F26B 3/02; F26B 23/06; C01G 53/06
(Continued)

(56) References Cited

U.S. PATENT DOCUMENTS 2,867,522 A * 1/1959 Leroy ....................... C05B 1/02
71/37
5,694,701 A * 12/1997 Huelsman .............. G11B 5/842
34/421
(Continued)

FOREIGN PATENT DOCUMENTS

CA      2291048 A1 * 12/1998
CN      1003369 B      2/1989
(Continued)

OTHER PUBLICATIONS

International Search Report and Written Opinion for corresponding PCT/EP2021/085257, mailed Mar. 10, 2022, 8 pages.

*Primary Examiner* — Stephen M Gravini
(74) *Attorney, Agent, or Firm* — Armstrong Teasdale LLP

(57) ABSTRACT

Disclosed herein is a process for removing water from a particulate material selected from (oxy)hydroxides and carbonates containing at least one of nickel, cobalt, and at least one metal other than nickel. The process includes the step of introducing at least one particulate material with a water content in the range of from 1 to 30% by weight, referring to said particulate material, into a rotary kiln with external heating elements and moving it through the rotary kiln together with a flow of a gas. The residual moisture of the resultant product is in the range of from 50 ppm to 1.5% by weight.

9 Claims, 1 Drawing Sheet

(58) Field of Classification Search
USPC .......................................................... 34/282
See application file for complete search history.

(56) References Cited

U.S. PATENT DOCUMENTS

| | | | |
|---|---|---|---|
| 6,901,684 B2 * | 6/2005 | Ito ........................... C04B 35/50 |
| | | | 34/384 |
| 9,233,863 B2 * | 1/2016 | Cable ........................ C02F 1/72 |
| 9,333,467 B2 * | 5/2016 | Jang ........................ B24D 18/00 |
| 9,833,766 B2 * | 12/2017 | Braun ............... B01J 20/28004 |
| 10,857,256 B2 * | 12/2020 | Mark ................... C08F 265/04 |
| 12,103,039 B2 * | 10/2024 | Efner ................... B05D 3/0281 |
| 12,327,854 B2 * | 6/2025 | Asfha .............. H01M 8/04007 |
| 12,405,057 B2 * | 9/2025 | Andrews ................ A61K 35/16 |
| 12,510,296 B2 * | 12/2025 | Zielinski ............... F26B 9/003 |
| 12,537,239 B2 | 1/2026 | Koo et al. |
| 12,539,355 B2 * | 2/2026 | LaRocque ........... A61M 1/0272 |

| | | | |
|---|---|---|---|
| 2019/0359497 A1 | 11/2019 | Ma et al. |
| 2020/0161652 A1 | 5/2020 | Erk et al. |
| 2021/0057746 A1 | 2/2021 | Inoue et al. |
| 2024/0110747 A1 * | 4/2024 | Hensler .................... F26B 3/02 |

FOREIGN PATENT DOCUMENTS

| | | | | |
|---|---|---|---|---|
| EP | 3412633 A1 | 12/2018 | |
| EP | 4263434 B1 * | 3/2025 | .............. F26B 23/06 |
| ES | 3021461 T3 * | 5/2025 | .............. F26B 23/06 |
| JP | S5477297 A | 6/1979 | |
| JP | H08-301614 A | 11/1996 | |
| JP | 2005324973 A | 11/2005 | |
| JP | 2006336919 A | 12/2006 | |
| WO | WO-9853711 A1 * | 12/1998 | ........... F26B 21/333 |
| WO | 2014159118 A1 | 10/2014 | |
| WO | 2019166253 A1 | 9/2019 | |
| WO | 2019185421 A1 | 10/2019 | |
| WO | WO-2022128804 A1 * | 6/2022 | ............ C01G 53/50 |

* cited by examiner

PROCESS FOR REMOVING WATER FROM A PARTICULATE MATERIAL

CROSS-REFERENCE TO RELATED APPLICATIONS

This application is a U.S. National Phase Application of International Patent Application No. PCT/EP2021/085257, filed Dec. 10, 2021, which claims priority to European Patent Application No. 20215380.5, filed Dec. 18, 2020, each of which is hereby incorporated by reference herein.

The present invention is directed towards a process for removing water from a particulate material selected from (oxy)hydroxides and carbonates containing at least one of nickel or cobalt and at least one metal other than nickel, said process comprising the step of introducing at least one particulate material with a water content in the range of from 1 to 30% by weight, referring to said particulate material, into a rotary kiln with external heating elements and moving it through the rotary kiln together with a flow of a gas, wherein the residual moisture of the resultant product is in the range of from 50 ppm to 1.5% by weight.

Water removal from particulate solid materials has been a topic of great interest. Drying of wet materials is a basic operation in pre-industrial as well as industrial process technology. Several challenges have to be met: In many cases, the morphology of said particulate materials needs to be preserved, and neither dusting nor lump nor ring formation is desired. The heat transfer needs to be efficient: due to the high evaporation energy, a lot of energy has to be transferred to the wet material, and regardless of the way how the energy is generated, high energy losses are undesired.

In continuous processes, water removal offers even more challenges because in many continuous reactors, the reaction time is an average time. Both shortcuts and extremely long residence times of groups of particles need to be avoided due to incomplete reaction and undesired agglomeration of secondary particles, respectively.

In the manufacture of cathode active materials for lithium ion batteries, the topic of water removal has become of increased interest. Corresponding composite oxides are generally manufactured by using a two-stage process. In a first stage, a sparingly soluble compound of the transition metal (s) is made by precipitating it from a solution, for example a carbonate or a hydroxide. This sparingly soluble salt is in many cases also referred to as a precursor. Such precursors are expected to meet tight specifications with regard to their particle size distribution and internal physical structure, characterized by e.g. their degree of sphericity or specific surface area (BET surface). In a second stage, said precursor is composite with a lithium compound, for example $Li_2CO_3$, LiOH or $Li_2O$, and calcined at high temperatures, for example at 600 to 1100° C. Water removal thus is crucial between the two stages. A homogeneous precursor both in composition including water content, and morphology including particle size distribution is highly desired.

In many cases, after co-precipitation the precursor is separated from the mother liquor by solid-liquid separation methods, especially by filtration. The resulting filter cake may contain up to 30% by weight of water. A removal of said water requires a lot of energy. At the same time, it is desired to not negatively affect the morphology of the precursor.

It was therefore an objective of the present invention to provide a process by which water may be removed from particulate materials in an economic way, with the morphology of the particulate material being preserved. It was further an objective to provide a reactor for performing such a process.

Accordingly, the process as defined at the outset has been found, hereinafter also referred to as "inventive process" or "process according to the present invention". The inventive process is a continuous process.

The inventive process starts off from a particulate material, also referred to as particulate solid, especially from a filter cake. Said particulate material introduced in the inventive process is wet. This shall mean in the context of the present invention that the wet particulate material has a water content in the range of from 1 to 30% by weight. The water content may be determined by drying in vacuo at a temperature of 100° C. until the weight is remaining unchanged. In the course of the inventive process, said wet particular material is introduced as a paste, a slurry or moist powder or an agglomerated moist powder. In a preferred embodiment, the wet particulate material is provided as a filter cake.

Said particulate material may have an average diameter ($d_{50}$) in the range of from 1 µm to 1 mm, preferably 2 µm to 100 µm. The average diameter is advantageously determined by LASER diffraction, and in the context of the resent invention, it refers to the mass median value. Said particulate material may have an irregular shape but in a preferred embodiment, said particulate material has a regular shape, for example spheroidal or even spherical. The aspect ratio may be in the range of from 1 and 10, preferably from 1 to 3 and even more preferably from 1 to 1.1. The aspect ratio is defined as the ratio of width to length or specifically the particle diameter in the longest dimension versus the particle diameter in the shortest dimension. Perfectly spherical particles have an aspect ratio of 1.

In a preferred embodiment of the present invention, the wet particulate material is provided as a filter cake from a precipitation or preferably co-precipitation of a precursor for cathode active materials for lithium ion batteries. In such embodiments, said particulate solid preferably has an average particle diameter (d 50) in the range of from 2 to 20 µm and even more preferably from 3 to 15 µm. For example, the wet particulate material may be provided as a filter cake from a precipitation of nickel hydroxide or cobalt hydroxide or from nickel carbonate or cobalt carbonate or from a co-precipitation.

The particulate material is selected from oxides, (oxy) hydroxides and carbonates of transition metals, preferred are carbonates and even more preferred are (oxy)hydroxides. The term oxyhydroxides does not only refer to compounds that contain the same stoichiometric share of oxide and hydroxide ions but also to non-stoichiometric compounds.

The particulate material is selected from (oxy)hydroxides and carbonates containing at least one transition metal selected from of nickel or cobalt and at least one metal other than nickel. Thus, it may be cobalt oxyhydroxide or cobalt hydroxide or cobalt carbonate or a carbonate or (oxy) hydroxide of nickel that contains at least one metal other than nickel, for example manganese or cobalt.

In one embodiment of the present invention, said particulate material is selected from composite (oxy)hydroxides of nickel and at least one transition metal selected from cobalt and manganese and containing, optionally, at least one further metal selected from Mg, Al, Ba, Ti, Zr, Nb, Ta, W, Mo, Sb, and Y.

In one embodiment of the present invention, said particulate material is selected from composite carbonates of nickel and at least one transition metal selected from cobalt and manganese and containing, optionally, at least one further metal selected from Mg, Al, Ba, Ti, Zr, Nb, Ta, W, Mo, Sb, and Y, preferably from composite carbonates of nickel and manganese. In this context, carbonates include basic carbonates, that are carbonates that contain some hydroxide or oxide counterions as well.

The wet particulate material may contain minor amounts of lithium, for example 1.5 to 3 mol-% with respect to cobalt or the sum of nickel and cobalt and other transition metals present in said (oxy)hydroxide or carbonate, as the case may be.

In a preferred embodiment of the present invention, the wet particulate material is free from lithium. In this context, "free from lithium" refers to a lithium content of less than 1 mol-% referring to cobalt or the sum of nickel and cobalt and other transition metals present in said (oxy)hydroxide or carbonate, as the case may be.

Some elements are ubiquitous. In the context of the present invention, traces of ubiquitous metals such as sodium, calcium, iron or zinc as impurities will not be taken into account in the description of the present invention. Traces in this context will mean amounts of 0.02 mol-% or less, referring to the total metal content of the starting material. In addition, residual sulphate anions stemming from any sulphate starting material will be neglected as well.

In one embodiment of the present invention, the metal part of the mixed carbonate or mixed hydroxide of nickel and at least one transition metal selected from cobalt and manganese corresponds to general formula (I)

$$Ni_aM^1_bMn_c \qquad (I)$$

where the variables are each defined as follows:

$M^1$ is Co or a combination of Co and at least one metal selected from Ti, Zr, Al and Mg, a is in the range from 0.15 to 0.95, preferably from 0.6 to 0.92 or from 0.15 to 0.3 b is in the range from zero to 0.35, preferably 0.05 to 0.2, c is in the range from zero to 0.8, preferably 0.05 to 0.2, and a+b+c=1.0 and at least one of b and c is greater than zero.

In one embodiment of the present invention, the average residence time of the particulate solid is in the range of from 30 minutes to 5 hours, preferably 1 to 3 hours. In this context, the average residence time refers to the average residence time of the particulate material in the rotary kiln.

In one embodiment of the present invention, the wet particulate solid is introduced into the rotary kiln at ambient temperature. In another embodiment of the present invention, the wet particulate solid is introduced into the rotary kiln at a temperature of from 50° C. to 100° C.

In one embodiment of the present invention, the wet particulate solid is introduced into the rotary kiln by a chute or a vibrating chute, by a spiral conveyor or a screw conveyor, preferably by a screw conveyor with a single screw or multiple screws.

The wet particulate solid is then moved through the rotary kiln. Upon moving wet particulate solid the moisture content decreases. Preferably, at the end of the inventive process the residual moisture content is in the range of from 50 ppm to 1.5% by weight, preferably 100 to 300 ppm by weight. The ppm are parts per million and refer to the weight. The residual moisture content may be determined by Karl-Fischer titration or by thermo gravimetric methods.

In one embodiment of the present invention, the retort length of the rotary kiln is from one to 50 m, preferably from 5 to 25 meter.

In one embodiment of the present invention, the retort diameter of the rotary kiln is in the range of from 0.2 to 4 meter, preferably 1 to 2 meter.

In one embodiment of the present invention, the ratio retort length to retort diameter is in the range of from 5 to 50, preferably 10 to 25.

In one embodiment of the present invention, the rotary kiln is exactly horizontal. In another embodiment, the rotary kiln is tilted, for example with a tilt angle in the rage of from 0.2 to 7°, and the movement of the particulate solid through the rotary kiln is supported by gravitational force.

In one embodiment of the present invention, the rotary kiln is operated with 0.01 to 20 revolutions per minute, preferred are 0.5 to 5 revolutions per minute, and, in each case, continuously or in intervals. When operation in an interval mode is desired it is possible, for example, to stop the rotation after one to 5 revolutions for one to 60 minutes, and then to again perform 1 to 5 revolutions and again stop for 1 to 60 minutes, and so forth.

In one embodiment of the present invention, the rotary kiln may comprise internals. Internals may comprise multiple mechanicals units such as vertical baffles or dams, helical vanes, straight or inclined blades, L-lifters, plough shares, chain curtains or shovels. Internals may cover the entire cross section from the wall to the center of the rotary kiln or they may expand partially from the wall to center of the rotary kiln. Preferably, internals are arranged in sections of 0.2 to 5 m length along the axis of the rotary tube, each section comprising of 1 to 24 individual mechanical units distributed regularly along the circumference of the rotary tube.

The rotary kiln has one or more external heating elements, for example an external furnace. The heat from such external furnace my be generated through gas firing, electrical resistance heating, inductive heating, or micro-wave heating.

Said particulate material is moved through the rotary kiln with a flow of gas. Said gas may be air, an inert gas such as nitrogen, or oxygen-depleted air or oxygen-enriched air or flue gases. air and flue gases are preferred.

In one embodiment of the present invention, the flow of gas has an inlet temperature in the range of from zero to 1400° C., preferred are 100 or 200 to 1000° C. In embodiments wherein the gas inlet temperature is 100° C. or higher a preheating system is required. In embodiments wherein a preheating system is not desired the inlet temperature corresponds to ambient temperature.

In one embodiment of the present invention, said particulate material is moved through the rotary kiln with a co-current flow of gas. In another embodiment of the present invention, said flow of gas and said particulate solid are moved through the rotary kiln counter-currently. The co-current flow has the disadvantage that the almost finished precursor is in contact with gas comparably rich in humidity and carbon dioxide. This disadvantage is avoided if flow of gas and motion of particulate solid are countercurrent.

In one embodiment of the present invention, on the discharge end of said rotary kiln, an inlet stream of inert gas, air, oxygen-enriched or oxygen-depleted air or flue gases are introduced into the rotary kiln.

In one embodiment of the present invention said rotary kiln has at least two distinguishable zones in which the particulate material is treated at different temperature levels, for example two to six temperature zones. The distinguishable zones are preset by the strongly endothermic process steps—evaporation of water and chemical decomposition of hydroxide or carbonate as water or carbon dioxide or by applying different temperature levels via separate external heating zones.

In a preferred embodiment, in a first temperature zone the temperature of said particulate material is in the range of from 80 to 130° C. and in a second temperature zone, the temperature is in the range of from 200 to 500° C., preferably 200 to 450° C., more preferably 220 to 300° C. Said temperature may be determined with a sensor.

By performing the inventive process, removal of water and, if applicable, of carbonate from particulate materials may be performed in an economic way, with the morphology of the particulate material being preserved. In particular, by carrying out water evaporation and hydroxide/carbonate decomposition according to the inventive process reduces equipment footprint and complexity as well as it improves the overall energy efficiency due to more efficient use of the sensible heat of the materials as well as reducing heat losses.

The invention is further illustrated by the following working examples.

Figures 1, 2, 3:
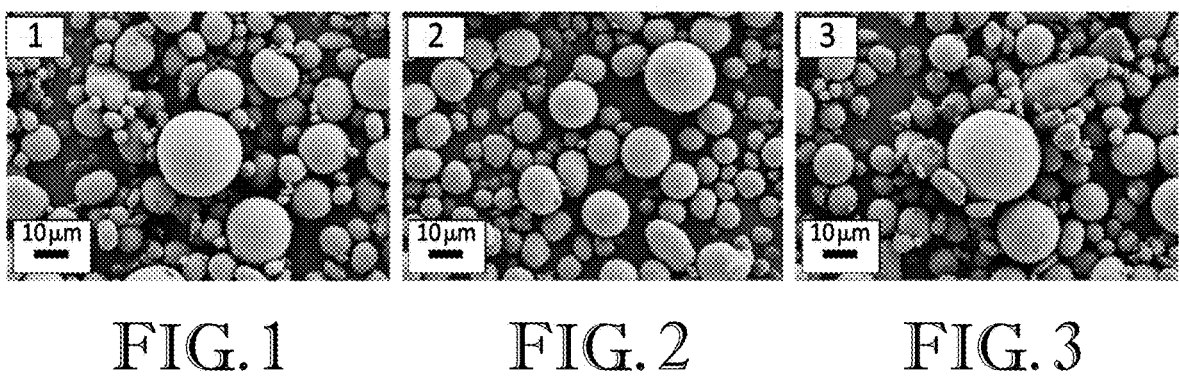
FIG. 1 is a Scanning Electron Microscope (SEM) picture of precursors made according to Example II.1.
FIG. 2 is a SEM picture of precursors made according to Example II.2.
FIG. 3 is a SEM picture of comparative precursors made according to Example II.3.

General: $d_{10}$, $d_{50}$ and $d_{90}$ refer to the particle diameters at 10, 50 and 90% of the cumulative volume distribution).

I. Co-Precipitation of a Precursor

A continuous stirred tank reactor was filled with deionized water and 49 g of ammonium sulfate per kg of water. The solution was tempered to 55° C. and a pH value of 12 was adjusted by adding an aqueous sodium hydroxide solution.

The co-precipitation reaction was started by simultaneously feeding an aqueous transition metal sulfate solution and aqueous sodium hydroxide solution, and a total flow rate resulting in an average residence time of 8 hours. The transition metal sulfate solution contained the sulfates of Ni, Co and Mn at a molar ratio of 88:7:5 and a total transition metal concentration of 1.65 mol/kg. The aqueous sodium hydroxide solution was a 25 wt. % sodium hydroxide solution and 25 wt. % ammonia solution in a weight ratio of 6. The pH value was kept at 12 by the separate feed of an aqueous sodium hydroxide solution. Beginning with the start-up of all feeds, the resultant slurry was removed continuously.

The slurry was then filtered in a filter press. The resultant filter cake was washed with deionized water and then with aqueous sodium hydroxide solution. The resultant wet filter cake of precursor was obtained, residual water content 9.5% by weight, referring to the overall filter cake, average particle diameter ($d_{50}$) of 11 μm, span [($d_{90}$)–($d_{10}$) divided by ($d_{50}$)]: 1.4.

II. Drying of the Filter Cake

II.1 Drying and De-Watering in a Rotary Kiln with 5 Heating Zones

The wet filter cake resulting from Example I: was then fed to a continuously operated electrically heated rotary kiln, mass flow rate of 20 kg/h. The rotary kiln had a heated length of 6 m and an inner diameter of 0.3 m and was heated of a length of 6 m by an external electrical resistance furnace, with five evenly distributed heating zones. The set temperature was set to 200 and 240° C. in the first two zones measured from the solids feed side (drying zone) and 320, 440, 490° C. in the last heating three zones (hydroxide decomposition zones). The average residence time of the particulate material amounted to 90 min in the heated section of the kiln. The volume flow of the countercurrent gas flow (air) amounted to 20 m³/h, determined at standard conditions. The air inlet temperature was at ambient temperature.

As a result, a fine powder of a dehydroxylated metal oxide was obtained with a residual moisture content of 500 ppm, determined by Karl-Fischer titration, and with a phase pattern characteristic for nickel oxide (bunsenite) as determined by powder X-Ray diffraction measurements. A SEM picture of the precursors is represented in FIG. 1.

II.2 Drying and De-Watering in a Rotary Kiln

The wet filter cake resulting from Example I. was then fed to a continuously operated electrically heated rotary kiln, mass flow rate of 20 kg/h. The rotary kiln had a heated length of 2.3 m and an inner diameter of 0.26 m and was heated of a length of 6 m by an external electrical resistance furnace. The set temperature was set to 475° C. The average residence time of the particulate material amounted to 45 min in the heated section of the kiln. The volume flow of the countercurrent gas flow (air) amounted to 3 m³/h, determined at standard conditions. The air inlet temperature was at ambient temperature.

As a result, a fine powder of a dehydroxylated metal oxide was obtained with a residual moisture content of 0.45% by weight, determined by Karl-Fischer titration, with a BET specific surface area of 60 m²/g (determined by $N_2$ adsorption method), and with a phase pattern characteristic for nickel oxide (bunsenite) as determined by powder X-Ray diffraction measurements. A SEM picture of the precursors is represented in FIG. 2.

II.3 Drying in a Rotary Kiln (Comparative) without Removal of Hydroxyl Groups

The wet filter cake resulting from Example I. was subsequently fed to a continuously operated electrically heated rotary kiln with a mass flow rate of 1.5 kg/h. The rotary kiln had a heated length of 1 m and an inner diameter of 0.1 m. The kiln was operated at a furnace temperature of approx. 150° C. The average residence time of the particulate material amounted to 50 min in the heated section of the kiln. The volume flow of the countercurrent gas flow (air) amounted to 1 Nm³/h. As a result, a fine powder of a dehydroxylated metal oxide was obtained with a BET specific surface area of 33 m²/g, residual water content of 1 wt % and total LOI (loss on ignition) of 21.2 wt %. The comparative precursor so obtained showed a crystal phase pattern characteristic for nickel hydroxide (theophrastite). A SEM picture of the comparative precursors is represented in FIG. 3.

The invention claimed is:

1. Process A process for removing water from a particulate material selected from the group consisting of (oxy) hydroxides and carbonates containing at least one transition metal selected from the group consisting of nickel, cobalt, and at least one metal other than nickel, said process comprising the step of introducing at least one particulate material with a water content in the range of from 1 to 30% by weight, referring to said particulate material, into a rotary kiln with external heating elements and moving the at least one particulate material through the rotary kiln together with a flow of a gas, wherein an average residence time of the particulate material is in the range of from 30 minutes to 5 hours and wherein a residual moisture of the resultant product is in the range of from 50 ppm to 1.5% by weight.

2. The process according to claim 1 wherein the flow of gas is counter-current with respect to the movement of the particulate material.

3. The process according to claim 1 wherein the particulate material is selected from the group consisting of composite (oxy) hydroxides of nickel and at least one transition metal selected from the group consisting of cobalt and manganese and containing, optionally, at least one further metal selected from the group consisting of Mg, Al, Ba, Ti, Zr, Nb, Ta, W, Mo, Sb, and Y.

4. The process according to claim 1 wherein the flow of gas has an inlet temperature in the range of from zero to 1400° C.

5. The process according to claim 1 wherein the particulate material is free from lithium.

6. The process according to claim 1 wherein said rotary kiln has at least two distinguishable zones in which the particulate material is treated at different temperature levels.

7. The process according to claim 5 wherein in a first temperature zone, the temperature of said particulate material is in the range of from 80 to 130° C. and in a second temperature zone, the temperature is in the range of from 200 to 500° C.

8. The process according to claim 1 wherein on the discharge end of said rotary kiln, an inlet stream of inert gas, air, oxygen-enriched or oxygen-depleted air or flue gases are introduced into the rotary kiln.

9. The process according to claim 1 wherein the particulate material is selected from the group consisting of composite carbonates of nickel and at least one transition metal selected from the group consisting of cobalt and manganese and containing, optionally, at least one further metal selected from the group consisting of Mg, Al, Ba, Ti, Zr, Nb, Ta, W, Mo, Sb, and Y, and wherein the carbonate is at least partially removed as carbon dioxide.

* * * * *